United States Patent [19]

Patron et al.

[11] 3,755,278

[45] Aug. 28, 1973

[54] PROCESS FOR THE POLYMERIZATION OF ETHYLENICALLY UNSATURATED MONOMERS

[75] Inventors: Luigi Patron, Venezia; Luciano Console, Mestre, both of Italy

[73] Assignee: Chatillon Societe Anonima Italiana per de Fibre Tessili Artificiali S.p.A., Milan, Italy

[22] Filed: Aug. 6, 1971

[21] Appl. No.: 169,806

[30] Foreign Application Priority Data
Aug. 10, 1970  Italy .............................. 28465 A/70

[52] U.S. Cl. .......... 260/88.7 R, 252/431, 260/63 K, 260/67 UA, 260/78.5 UA, 260/79.3 M, 260/79.7, 260/88.3 R, 260/88.3 L, 260/91.1 M, 260/91.7, 260/92.1, 260/92.8 R, 260/93.5 S, 260/94.2 R, 260/94.2 M, 260/94.9 R

[51] Int. Cl. .......... C08f 3/30, C08f 3/76, C08f 7/02

[58] Field of Search ................. 260/88.7 R, 88.7 D, 260/91.1 R, 93.5 S, 85.5 R, 85.5 D, 92.8 R

[56] References Cited
UNITED STATES PATENTS

| | | | |
|---|---|---|---|
| 3,637,620 | 1/1972 | Patron et al. ...................... | 260/87.1 |
| 3,637,624 | 1/1972 | LoMonaco et al. ................ | 260/87.1 |
| 3,635,925 | 1/1972 | LoMonaco et al. ................ | 260/87.1 |
| 3,637,623 | 1/1972 | LoMonaco et al. ................ | 260/87.1 |
| 2,470,910 | 5/1949 | Baer ............................... | 260/85.5 D |

*Primary Examiner*—Harry Wong, Jr.
*Attorney*—Stevens, Davis, Miller & Mosher

[57] ABSTRACT

A process is disclosed for the polymerization in bulk or in solution of one or more ethylenically unsaturated monomers wherein the polymerization is conducted in the presence of a catalytic system consisting of:
  a. an organic hydroperoxide;
  b. an alkyl or cyclo-alkyl ester of sulphuric or phosphoric acid, wherein the alkyl or cycloalkyl group contains from 1 to 12 carbon atoms; and
  c. a nucleophilic compound such as an alcoholate of an alkali or alkaline-earth metal, wherein the alkyl radical may have a linear or branched chain having from 1 to 6 carbon atoms, or a hydroxide of an alkali metal fed to the reaction medium in an alcoholic solution or alcoholic solutions of ammonia, of pyridine, or of other nitrogen containing bases such as tetraalkyl-ammonium hydroxide. The polymerization is carried out at a temperature between +50° and −50° C.

15 Claims, No Drawings

PROCESS FOR THE POLYMERIZATION OF ETHYLENICALLY UNSATURATED MONOMERS

The present invention relates to a process for the polymerization in bulk or in solution of ethylenically unsaturated monomers.

More particularly, the present invention relates to a process for the polymerization in bulk or in solution of ethylenically unsaturated monomers of the general formula:

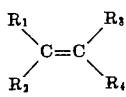

in which $R_1$, $R_2$, $R_3$ and $R_4$ may be, independently of one another, hydrogen atoms, halogen atoms such as chlorine, bromine or fluorine, simple or substituted saturated or unsaturated alkyl radicals, simple or substituted aromatic radicals, simple or substituted saturated or unsaturated cycloalkyl radicals, aryl radicals, simple or substituted etherocyclic radicals, ether groups, carboxylic, amide, alkyl-oxy-carbonyl, aryl-oxy-carbonyl, nitrile, ketone, thioether, sulphone, aldehyde, alkyl-carbonyloxy, aryl-carbonyl-oxy groups, etc.

It is well known that ethylenically unsaturated monomers may be polymerized in the presence of compounds which originate free radicals. Such polymerizations are in general carried out in bulk, in solution or in an aqueous emulsion in the presence of emulsifying agents or in aqueous suspension.

Free radical polymerization initiators are well known in the literature and can be conventionally classified as catalyst systems having either one component or more than one component. The first of these systems may be organic or inorganic compounds which become active initiators through thermal decomposition. Examples of such initiators are acyl-peroxides, alkyl-hydroperoxides, alkyl-peroxides, per-esters, azo-compounds, etc.

Catalyst systems consisting of more than one component may be of either organic or inorganic nature and become active initiators by mutual reaction. Some common systems falling in this category include persulphate-bisulphite salts, hydrogen peroxide-ferrous salts, cumene hydroperoxide-ferrous salts, etc.

The use of catalyst systems consisting of more than one component is generally preferred as compared to those based on thermal decomposition systems, because the former permit an easier regulation of the polymerization speed and of the molecular weight of the polymers as well as, in some cases, a much higher polymerization speed especially at relatively low temperatures. Most of these catalyst systems, however, turn out to be efficient polymerization initiators only at rather high temperatures. Other known catalyst systems that are active at relatively low temperatures, that is temperatures lower than 0°C, are characterized by a high decomposition speed, and turn out to be quite inefficient at higher temperatures because they decompose immediately without giving rise to the desired polymerization.

It is therefore an object of the present invention to provide a new catalyst system capable of promoting the polymerization in bulk or in solution of the above-defined ethylenically unsaturated monomers with high polymerization speeds both at low and high temperatures and with the production of very white polymers with a high thermal stability.

It has now surprisingly been found in accordance with this invention that this object is attained by using a new catalyst system consisting of:

a. an organic hydroperoxide;
b. an alkyl or cycloalkyl ester of sulphuric or phosphoric acid, wherein the alkyl or cycloalkyl group contains from 1 to 12 carbon atoms; and
c. a nucleophilic compound such as an alcoholate of an alkali or alkaline-earth metal, wherein the alkyl radical may have a linear or branched chain having from 1 to 6 carbon atoms, or a hydroxide of an alkali metal fed to the reaction medium in alcoholic solution, or alcoholic solutions of ammonia, pyridine or other nitrogen-containing bases, such as tetraalkyl ammonium hydroxide, etc.

The above catalyst system produces free radicals capable of starting the polymerization of the ethylenically unsaturated compounds at any temperature between +50° and −50° C and resulting in very white polymers having a high thermal stability.

The term "organic hydroperoxide" means an organic compound of the general formula R-O-O-H, in which R may be a linear or branched alkyl radical, a cycloalkyl radical, an aryl or arylalkyl radical, which radicals may or may not contain peroxide or hydroperoxide groups.

Examples of organic compounds of the general formula R-O-O-H as above defined and which may be profitably used in the process of the present invention are: methyl-, ethyl-, n-propyl-, ter-butyl, n-butyl-, amyl-, hexyl-, octyl- etc. hydroperoxide, ethylbenzylhydroperoxide, iso-butyl-benzyl-hydroperoxide, phenyl-isopropyl-hydroperoxide, cyclohexanone-di-hydroperoxide, methyl-ethyl-ketone hydroperoxide, etc.

Particularly advantageous results are attained by using cumene hydroperoxide or tertiary-butyl-hydroperoxide.

The concentration of the organic hydroperoxide is not critical and may generally range from 0.01 to about 3 percent by weight with respect to the monomers. Concentrations of hydroperoxide between 0.5 and 2 percent by weight are preferred.

The organic hydroperoxide may be fed to the reaction mass either as such or in solution in a suitable solvent, such as methyl, ethyl or propyl alcohol, hexane, etc.

The alkyl- or cycloalkyl esters of sulphuric or phosphoric acid having from 1 to 12 carbon atoms comprise di-methyl-sulphate, di-ethyl-sulphate, di-n-propyl sulphate, di-iso-propyl-sulphate, di-butyl-sulphate, ethyl-butyl-sulphate, di-amyl-sulphate, di-cyclo-hexyl-sulphate, di-( β -phenyl-ethyl-) sulphate, etc., as well as the corresponding esters of phosphoric acid such as tri-methyl-phosphate, tri-ethyl-phosphate, tri-propyl-phosphate, etc. Of these, the organic sulphates and phosphates with alkyl radicals having between 1 and 4 carbon atoms are preferred.

These esters are generally added to the reaction medium dissolved in an inert organic solvent.

In practice, an aliphatic alcohol having from 1 to 5 carbon atoms, and in particular an ethyl or methyl alcohol, is preferred.

The quantity of these esters varies with variation of the quantity of the organic hydroperoxide and in general quantities of ester corresponding to the molar ratio: ester of the sulphuric or phosphoric acid/organic hydroperoxide ranging from 0.5 to 5 may be used. In practice, the best results as regards the conversion, the color, and the heat stability of the polymer products are obtained when the ester is in molar excess with espect to the organic hydroperoxide.

Among the alkali and alkaline-earth metal alcoholates having from 1 to 6 carbon atoms, the sodium, potassium and magnesium methylates and ethylates are preferred for reasons of cheapness and ease of preparation.

The preferred hydroxides are sodium, potassium or tetra-methyl-ammonium hydroxide.

The concentration of the nucleophilic compound in the reaction medium is generally in molar excess with respect to the organic hydroperoxide concentration. The molar ratios: nucleophilic compound/organic hydroperoxide ranging from 1 to 5 are preferred.

As indicated above, the hydroxides are fed to the reaction medium in solution in an aliphatic alcohol. Practically, the preferred alcohols are the aliphatic alcohols having from 1 to 5 carbon atoms and of these methyl and ethyl alcohols are the most preferred.

Also the alcoholates, if desired, may be fed to the reaction medium in an alcoholic solution and one of the above-mentioned alcohols may be used. The quantity of these alchols has no influence on the polymerization, even though for practical reasons concentrated solutions are generally preferred.

Suitable ethylenically unsaturated monomers of the general formula:

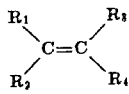

in which $R_1$, $R_2$, $R_3$ and $R_4$ may be, independently on one another, hydrogen, halogen atoms, simple or substituted saturated or unsaturated alkyl radicals, simple or substituted aromatic radicals, simple or substituted saturated or unsaturated cyclo-alkyl radicals, aryl radicals, simple or substituted ethero-cyclic radicals, ether groups, carboxylic, amide, alkyl-oxy-carbonyl, aryl-oxy-carbonyl, nitrile, ketone, thioether, sulphone, aldehyde, alkyl-carbonyl-oxy, aryl-carbonyl-oxy groups, etc., include in a non-limiting way: vinyl or vinylidene esters such as vinyl or vinylidene formate, acetate, propionate, benzoate; acrylic and methylacrylic acid and their derivatives such as the alkyl acrylates including methyl methacrylate, acrylamides, acrylonitrile, methacrylonitrile etc.; vinyl ketones such as methylvinyl ketone, etc.; vinyl ethers such as vinyl-ethyl-ether, non-saturated aldehydes such as acrolein, vinyl sulphones such as vinyl-phenyl-sulphone; etherocyclic compounds substituted by a vinyl group such as vinyl-pyridines and vinyl-pyrrolidones; vinyl thioethers such as vinyl-ethyl-sulphide; hydrocarbon compounds such as divinyl-benzene, ethylene, styrene, butadiene, vinyl or vinylidene compounds containing chlorine, bromine or fluorine such as vinyl chloride, vinylidene chloride, vinyl bromide, vinyl fluoride, etc.

These monomers may not only be homopolymerized but also they may be copolymerized with each other or with copolymerizable resins such as unsaturated polyesters.

Because of the great reactivity of the catalyst systems used in accordance with the present invention, it is possible to conduct polymerizations at high speed even at temperatures lower than 0°C with small quantities of the catalyst system. This allows one to obtain polymers containing very small proportions of catalyst residues.

According to the present invention, the polymerization of the above-indicated ethylenically unsaturated monomers can be effected either in bulk or in solution.

By "bulk polymerization" is meant not only polymerization when carried out in the undiluted monomer, but also when carried out in the presence of minor quantities of organic compounds which do not react with the catalyst system, which are liquid at the polymerization temperature, and which exert a a fluidizing action on the polymerization slurry, in order to render the latter more easily stirrable and for facilitating the desired thermal exchange through the walls of the polymerization reactor.

As fluidizing agents, the following substances may be used: aliphatic hydrocarbons, aryl hydrocarbons, cycloalkyl hydrocarbons, saturated halogenated hydrocarbons, etc.

By "polymerization in solution" is meant polymerization when carried out in the presence of organic compounds which are liquid at the polymerization temperature and which are solvents of the polymer. The choice of the organic liquid solvent depends upon the type of monomer which is to be polymerized.

Thus, for instance, when the monomer to be polymerized is acrylonitrile, the organic solvent may be selected from the class consisting of N,N-dimethyl-formamide; N,N-dimethyl-acetamide; γ -butyrolactone; dimethyl-sulphoxide; ethylene carbonate; etc. On the other hand, when the monomer to be polymerized is acrylic acid, advantageous solvents include the aliphatic alcohols having from 1 to 4 carbon atoms. The relative ratio: monomer/solvent is advantageously between 10 percent and 60 percent.

An alkyl mercaptan may be optionally fed in small quantities, such as for example from 50 to 1,000 ppm, to the polymerization slurry in order to regulate the molecular weight of the polymer. Suitable alkyl mercaptans are those having from 4 to 18 carbon atoms in the alkyl radical, e.g., the butyl mercaptans.

It is advisable to conduct the polymerization in the absence of oxygen which has an inhibiting effect on the polymerization. In general, for this purpose a suitable inert gas, such as for instance nitrogen, is used to eliminate the air from the polymerization reactor.

The polymerization may be conducted in practice in a continuous, semi-continuous or discontinuous way.

In order still better to illustrate the invention, the following specific working examples are given.

EXAMPLE 1

Into a 2 liter polymerization reactor containing 2,000 g of one of the monomers listed below in Table 1 and maintained at the indicated temperature, 20 g of cumene hydro-peroxide, 56 g of dimethyl-sulphate and 38.2 g of magnesium methylate in a 5 percent methanol solution, were introduced under stirring.

The reactor was then maintained at the indicated temperature, and under stirring in a nitrogen atmosphere, for 10 hours. Thereafter the reaction mass was discharged and the polymer was recovered by filtering.

In the following Table 1 are listed the polymerization temperatures and conversions for each specific monomer:

TABLE 1

| Monomer | Polymerization temperature in °C | Conversion in % |
|---|---|---|
| Styrene | +40° | 11 |
| Ethylvinyl ether | −30° | 9 |
| Ethylvinyl ether | +20° | 35 |
| Acrylonitrile | −20° | 15 |
| Acrylonitrile | 0° | 22 |
| Vinyl chloride | +30° | 14 |

EXAMPLE 2

Into a 2 liter polymerization reactor containing 2,000 g of vinyl chloride maintianed at +30° C were added, under stirring:

20 g of tributyl-phosphate,
10 g of cumene hydroperoxide, and
10 g of sodium methylate in a 10 percent methanol solution.

The reactor was kept at the temperature of +30° C, and under stirring, for 5 hours. Thereafter the reaction mass was discharged and the polymer was recovered by filtration.

The polymerization conversion was 12 percent.

EXAMPLE 3

The procedure of Example 2 was repeated but by admixing the following with 2,000 g of vinyl chloride:

20 g of pyridine,
10 g of cumene hydroperoxide, and
10 g of dimethyl-sulphate.

The polymerization conversion was 7 percent.

We claim:

1. A process for the polymerization in bulk or in solution of an ethylenically unsaturated monomer wherein the polymerization is conducted in the presence of a catalytic system consisting of
   a. an organic hydroperoxide;
   b. an ester selected from the group consisting of di-alkyl, di-cycloalkyl and di-arylalkyl-esters of sulfuric acid and tri-alkyl esters of phosphoric acid, wherein the alkyl or cycloalkyl group contains from 1 to 12 carbon atoms; and
   c. a nucleophilic compound selected from the group consisting of an alcoholate of an alkali or alkaline-earth metal, wherein the alkyl radical is a linear or branched chain having from 1 to 6 carbon atoms, or a hydroxide of an alkali metal fed to the reaction medium in an alcoholic solution or a nitrogen-containing base selected from the group consisting of ammonia, pyridine and tetra-alkyl-ammonium hydroxide fed to the reaction medium in an alcoholic solution, wherein the concentration of the organic hydroperoxide ranges from 0.01 percent to 3 percent by weight with respect to the monomer, the molar ratio of the ester/organic hydroperoxide ranges from 0.5 to 5 and the molar ratio of nucleophilic compound/organic hydroperoxide ranges from 1 to 5.

2. A process according to claim 1, wherein the polymerization is carried out at a temperature between +50° and −50° C.

3. A process according to claim 1, wherein alkyl esters having between 1 and 4 carbon atoms are used as the alkyl or cyclo-alkyl-ester of sulphuric or phosphoric acid.

4. A process according to claim 1, wherein a sodium, potassium or magnesium methylate or ethylate is used as the nucleophilic compound.

5. A process according to claim 1, wherein a sodium, potassium or tetra-methyl-ammonium hydroxide in an alcoholic solution is used as the nucleophilic compound.

6. A process according to claim 5, wherein for the preparation of the alcoholic solution there is used an aliphatic alcohol having from 1 to 5 carbon atoms.

7. A process according to claim 5, wherein for the preparation of the alcoholic solution there is used ethyl or methyl alcohol.

8. A process according to claim 1, wherein cumene hydroperoxide or ter-butyl-hydroperoxide is used as the organic hydroperoxide.

9. A process according to claim 1, wherein the hydroperoxide concentration varies from 0.5 to 2 percent by weight with respect to the monomers.

10. A process according to claim 1, wherein the ester of the sulphuric or phosphoric acid is in molar excess with respect to the organic hydroperoxide.

11. A process according to claim 1, wherein the nucleophilic compound is in molar excess with respect to the organic hydroperoxide.

12. A process according to claim 1, wherein the ester of the sulphuric or phosphoric acid is added to the reaction medium dissolved in an inert solvent.

13. A process according to claim 1, wherein the ester of the sulphuric or phosphoric acid is added to the reaction medium dissolved in an aliphatic alcohol having from 1 to 5 carbon atoms.

14. A process according to claim 1, wherein the polymerization is carried out in the presence of 50 – 1,000 ppm of an alkyl-mercaptan.

15. A process according to claim 1, wherein the polymerization is carried out in the presence of 50 – 1,000 ppm of an alkyl-mercaptan having from 4 to 18 carbon atoms.

* * * * *